United States Patent [19]

von Taschitzki

[11] 4,187,804
[45] Feb. 12, 1980

[54] WATER DISPENSER FOR LIVESTOCK

[75] Inventor: Rainer von Taschitzki, Cologne, Fed. Rep. of Germany

[73] Assignee: Aratowerk Walter von Taschitzki, Cologne, Fed. Rep. of Germany

[21] Appl. No.: 817,600

[22] Filed: Jul. 21, 1977

[30] Foreign Application Priority Data

Jul. 21, 1976 [DE] Fed. Rep. of Germany ....... 2632734
Jun. 2, 1977 [DE] Fed. Rep. of Germany ... 7717393[U]

[51] Int. Cl.$^2$ ............................................... A01K 7/00
[52] U.S. Cl. ............................ 119/72.5 HRC; 119/75; 222/402.21
[58] Field of Search ........................ 222/402.21, 402.22, 222/402.23, 402.24, 547, 556; 119/72.5, 75; 251/350, 354

[56] References Cited

U.S. PATENT DOCUMENTS

| | | | |
|---|---|---|---|
| 3,289,635 | 12/1966 | Eagles | 119/75 |
| 3,447,722 | 6/1969 | Mason | 222/136 |
| 3,513,811 | 5/1970 | Graham | 119/72.5 |
| 3,613,642 | 10/1971 | Restall et al. | 119/72.5 X |
| 3,734,063 | 5/1973 | Atchley | 119/72.5 |
| 3,735,955 | 5/1973 | Kerr et al. | 222/402.21 X |
| 3,756,199 | 9/1973 | Clark | 119/72.5 |

FOREIGN PATENT DOCUMENTS

2203147 8/1972 Fed. Rep. of Germany .......... 119/72.5
2218575 10/1973 Fed. Rep. of Germany ............. 119/75

*Primary Examiner*—Robert J. Spar
*Assistant Examiner*—Fred A. Silverberg
*Attorney, Agent, or Firm*—Diller, Ramik & Wight

[57] ABSTRACT

A water dispenser for livestock, particularly pigs, having a connecting portion for connection to a water pipe and the like with the dispenser preferably being in a horizontal or slightly inclined position and having a mouthpiece to be activated by the animal, the mouthpiece projecting from a casing of the dispenser and being tippable relative to the casing axis. The dispenser has a normally closed valve which is spring loaded to a closed position and is movable by the rear of the mouthpiece for effecting unseating of the valve in amount corresponding to the displacing of the mouthpiece. The mouthpiece and a foot of the valve have discs of generally the same size with the pivoting of the mouthpiece being transmitted by its disc to the disc of the foot to activate the valve by the tilting mouthpiece.

8 Claims, 3 Drawing Figures

WATER DISPENSER FOR LIVESTOCK

This invention relates in general to new and useful improvements in dispensing valves and more particularly to a water dispenser for livestock, particularly pigs.

In known water dispensers for livestock, release of the valve may be initiated by any movement of the mouthpiece. There is no provision for restriction of the pivotal movement of the mouthpiece in one direction. Also, because of the manner of support of the mouthpiece in the associated casing, when the mouthpiece is activated water can escape around the mouthpiece end into the casing and flow freely out of the casing, which flow occurring when the mouthpiece is raised slightly. The possibility of this secondary flow reduces the efficiency of the dispenser and much water may be lost, giving rise to waste of water on the floor beneath the dispenser. Inasmuch as known dispensers are not provided with any type of seal, they may be used only in association with low water pressure. When supplied with high water pressure, i.e. when connected to a main water supply, the dispenser is normally unusable because of the intensity of the secondary flow around the mouthpiece.

In view of the foregoing, an object of the invention is to provide a water dispenser of the type having a mouthpiece which is tiltable relative to the dispenser casing but wherein the dispenser is so internally constructed that it is extremely stable and reliable in operation. In accordance with this invention the mouthpiece and an opposed end of a valve foot are provided with opposing discs which are surrounded by a common guide ring and there is an annular seal member located on the mouthpiece with the seal member being sealingly clamped between two ring inserts of which one is the common ring and which inserts have opposed collars projecting inwardly therefrom and engaging opposite faces of the seal member.

A particular feature of the mounting of the annular seal member is that such arrangement ensures low wear and reliable operation of the dispenser. Wear of the seal member is totally eliminated by mounting the seal member between the two ring inserts. Since wear is eliminated, the degree of play provided in the dispenser is constantly maintained. Such a dispenser will have a long and reliable working life with the reliability of operation being extraordinary.

Another feature of the invention is to form the plunger portion of the valve member as a polygon in section with the disc of the foot of the valve being in the form of a sleeve surrounding the foot of the plunger portion. The casing is provided with axial grooves which receive and guide the edges of the plunger portion.

It is also to be understood that by mounting a collar around the foot portion of the plunger, segmental slots would be formed between the plunger and the collar to promote water flow along the opposite faces of the plunger. This arrangement considerably reduces manufacturing cost as compared to an arrangement requiring milled axial grooves.

It has also been found that improved guidance properties can be obtained with the arrangement described above as compared to a plunger foot provided with ribs. During assembly of the dispenser the free edges of the plunger foot are guided into grooves of the casing so as to prevent rotation of the plunger foot about its axis so that the plunger head formed as a screw may be screwed together with the plunger foot without the plunger foot having to be tightened by a tool.

In order to obtain reliability, the valve formed by the plunger head or valve member and a valve seat may incorporate an O-ring as the valve seat in that the plunger cannot rotate about its axis, and thus can cooperate with the O-ring in its accurately fixed position.

Another feature of the invention is that a loose ball may be located between the opposing discs of the mouthpiece and the foot of the valve plunger. The location of the loose ball between the discs means a deviation of the mouthpiece acting as the power arm of a lever system is translated into the maximum possible force on the plunger disc which acts as the load bearing arm. Even a slight shifting of the mouthpiece results in the movement of the plunger or valve sufficient to move the valve member to an open position. This enables even very small piglets to initiate water flow with relatively small exertion.

Notwithstanding the foregoing, valve opening is restricted to movements shifting the mouthpiece in a downward direction and lateral or upward movement of the mouthpiece will not effect any transfer of movement from the mouthpiece to the valve in view of the spacing of the mouthpiece from the valve. The ball adopts a correct position solely through its gravitational force. The dispenser can be operated by the animals even by taking the mouthpiece into their mouths in order to drink.

The invention has the added purpose of providing in the flow opening of the connecting portion a device permitting coordination of the water flow with the drinking speed of the animal, and at the same time is particularly simple and provides for a reliable operation when the correct flow rate is set.

Most particularly, provision is made for unification of a nozzle member serving to limit the flow rate with a sieve insert serving as a filter into a homogeneously-readily manageable component, the sieve insert being provided with a sleeve portion for reception in the connecting member and a projecting rim after the fashion of a cartridge case to effect the positioning of the filter, and the sleeve portion having telescoped therein the nozzle member.

The dispenser, utilizing the filter and nozzle member has the advantage that both parts may be combined into a simultaneously handleable component by simply thrusting the nozzle member into the filter. In setting the flow rate, a nozzle with the appropriate aperture is selected from several nozzle members and is inserted into the filter, after which the assembly is inserted into the dispenser. Changing of the nozzle entails merely withdrawing the filter by a simple manual removal without, as was previously necessary, loosening a screw connection by means of a tool. When the nozzle member and the filter are fitted one into the other, the projecting edge of the nozzle member serves to limit the insertion depth as does the projecting edge of the filter with respect to the connecting portion of the dispenser casing.

Further, the projecting part of the nozzle member may be provided with a circumferential groove so that it may be firmly grasped with the fingernails to effect withdrawing of the nozzle member from the filter.

With the above and other objects in view that will hereinafter appear, the nature of the invention will be more clearly understood by reference to the following description, the appended claimed subject matter, and the several views illustrated in the accompanying drawing.

Figures 1, 2, 3:
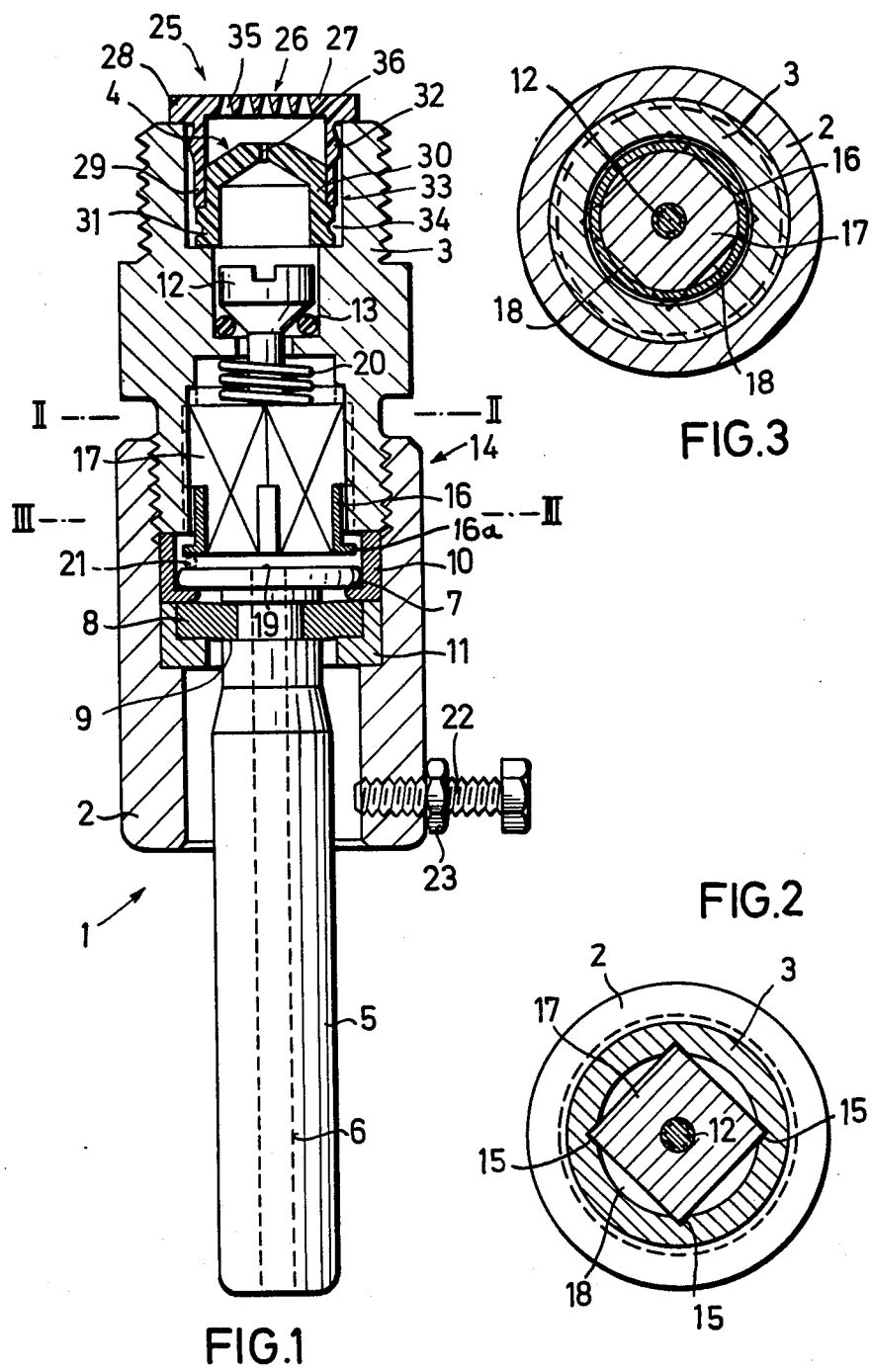
FIG. 1 is a longitudinal sectional view through the dispenser showing the specific details thereof.
FIG. 2 is a transverse sectional view taken along the line II—II of FIG. 1 and shows the mounting of the foot portion of the valve assembly in the casing.
FIG. 3 is a transverse sectional view taken along the line III—III of FIG. 1 and shows the construction of the lower or foot portion of the valve assembly.

Referring now to the drawings in detail, it will be seen that the water dispenser is generally identified by the numeral 1 and includes a two-part casing 2, the two parts of the casing being suitably secured together in telescoped relation, such as by a threaded connection.

The casing at one end is in the form of a nipple which functions as a connecting member, the nipple being identified by the numeral 3. It is to be understood that the nipple 3 may be readily threaded into a conventional water pipe fitting for direct connection of the casing to a water main.

The casing has a bore therethrough of varying cross-section and mounted in the casing remote from the nipple 3 is a mouthpiece 5 which projects beyond the casing. The mouthpiece 5 is provided with an internal bore 6 through which water will be dispensed.

It is to be understood that the rear end of the mouthpiece 5 is constructed with an integral disc or flange 7 which is of a larger diameter than remaining portions of the mouthpiece. The mouthpiece 5 is retained in the casing 2 by means of a flexible annular member 8 which may be considered to be a seal. The member 8 is retained within the groove 9 formed in the mouthpiece 5 adjacent the disc 7 and projects outwardly beyond the mouthpiece.

In order to effect the mounting of the seal 8 within the casing 2 in sealed relation, there is provided a guide ring 10 and a counter ring 11 both of which are separately formed and are tightly received within the casing 2 as inserts. The rings 10, 11 are in end abutting relation and each ring is provided with an inwardly directed annular flange, the outer peripheral portion of the seal 8 being clamped between the flanges of the rings 10, 11 in sealed relation.

The seal, being in the form of a flexible member, is distortable to permit the tilting of the mouthpiece 5 relative to the casing 2. The flange of the ring 10 functions as a fulcrum for the disc 7 and it is preferred that the periphery of the disc 7 be mounted, as illustrated, to permit the required pivotal movement relative to the ring 10 without binding.

Mounted within the casing 2 adjacent the disc 7 is a valve assembly of the plunger type. The valve assembly includes a valve member in the form of a plunger head 12 and is associated with a valve seat in the form of a O-ring 13. The O-ring 13 is snugly received within the bore of the casing 2 and is seated upon an internal projection of the casing. The plunger head 12 has a conical surface which engages the O-ring 13.

The valve assembly also includes a second plunger portion which may be considered a plunger foot and is identified by the numeral 14. The plunger head has a shank portion which is threadingly engaged in the plunger foot so that the two are movable as a unit.

Encircling the shank of the plunger head 12 and bearing against one end of the plunger foot 14 is a spring 20, which spring engages the projection of the casing on which the O-ring 13 is seated and constantly urges the plunger head 12 into seated engagement with the O-ring 13.

It will be seen that the plunger foot 14 is in the form of a polygon or polygonal lower part 17 and the internal wall of the casing is provided with axial grooves 15 receiving the corners of the plunger foot, as shown in FIG. 2. In this manner the plunger foot is mounted for guiding axial movement and at the same time is fixed against rotation so as both to facilitate the securing of the head portion thereto and to prevent the rotation of the head portion relative to the O-ring 13.

The lower part 17 of the plunger foot 14 has the corners thereof rounded, as shown in FIGS. 1 and 3, and an annular sleeve 16 is telescoped thereover with the sleeve 16, in conjunction with the surfaces of the polygon 17 defining narrow slots 18 (FIG. 3) through which water flows.

It is pointed out that the sleeve 16 at an end thereof opposing the disc 7 is also in the form of a disc or a radially outwardly directed peripheral flange 16a. The disc or flange 16a of the sleeve 16 cooperates with the disc 7 to overcome the spring 20 and move the valve assembly to an open position when the mouthpiece 5 is shifted.

Shifting of the mouthpiece out of its normal position by the drinking animal, through the distortion of the seal 8 causes the disc 7 to adopt an oblique position where, if the disc of the sleeve 16 is sufficiently close, will cause the valve assembly to shift axially to an open position. It is to be understood that because of the conical configuration of the valve member, flow will be in accordance with the degree of axial shifting. Upon release of the mouthpiece, the mouthpiece will automatically adopt a neutral position due to the resiliency of the seal 8. At the same time the spring 20 will again seat the valve member. It is to be understood that the axial dimension of the space 19 between the disc 7 and the disc of the sleeve 16 may be adjusted by changing the position of the plunger head 12 relative to the plunger foot 14. It is also to be noted that since the two discs are almost the same diameter, control of the opening of the valve is sensitive.

Although it has not been so specifically illustrated, it is pointed out that the rings 10, 11 are positioned in the casing 2 by being threaded into place. It is also pointed out that the guide ring 10 is formed of a wear resistant material such as stainless steel so that as the disc pivots thereon as a fulcrum the guidering wears very slowly.

In order that animals can operate the dispenser only for drinking it is appropriate to permit only pivotal movement of the mouthpiece 5 downwardly to effect the valve operation. In order to accomplish this, the dispenser must be mounted in a generally horizontal position and is preferably slightly downwardly inclined. When so positioned, a loose ball 21 may be incorporated in the space 19 and this ball, because of its weight, will always lie in the lowest part of the space 19 so that only the lower part of the disc 7 can transmit valve actuating movement to the valve assembly. It will be readily apparent that with the ball 21 in position the disc 7 is too remote from the disc of the sleeve 16 for the valve assembly to be operated by tilting of the mouthpiece 5 in any other direction.

The casing 2 may be provided with a set screw 22 which extends radially through the casing and is engageable with the mouthpiece to hold it in a tilted position. When the dispenser is provided with the ball 21, the set screw 22 must be opposite to the position of the ball. The set screw 22 is held in place by a lock nut 23 and is so adjustable that there may be either drop-by-drop delivery of water or continuous water flow.

The flow rate in the casing 2 is regulated by a fitting 25 which includes a sieve insert 26 which functions as a filter, and of a nozzle member 4. The sieve insert 26 includes a perforated plate 27 and a sleeve 29 with the plates 27 having an edge 28 projecting beyond the sleeve 29 giving the sieve insert roughly the shape of a cartridge case.

The nozzle member 4 is cup shaped and its dimensions are such that it can be firmly pushed into the sleeve 29 until the sleeve 29 engages a projecting rib 31 of the nozzle member 4. Thus, both parts, sieve insert 26 and nozzle member 4, can be combined to form a unitary fitting.

The sleeve 29 is provided with at least one annular pad 32 which is engageable with the internal surface of the nipple 3 to form a seal. The sleeve 29 is preferably formed of a resilient material, such as a plastics material, so that the pad 32 may be compressed when it is inserted into the bore 33 of the nipple 3 to form a perfect seal.

It is pointed out that the rim 31 of the nozzle member 4 is provided with a peripheral groove 34 which provides a good grip for one's fingernails so as to facilitate separation of the nozzle member 4 from the insert 26.

Both the sieve insert 26 and the nozzle member 4 can be readily formed of plastics material by injection molding procedures. The holes 35 in the sieve insert 26 can be advantageously shaped so as to increase in cross-section in the direction of water flow. Further, it is proposed that there be provided several nozzle members 4 each having a different size of aperture 36 as may be required in order to obtain a correct flow rate from the dispenser. In order that the respective sizes of apertures 36 may be readily recognized, the nozzle members 4 may be pigmented in different colors or otherwise color-coded.

Although only a preferred embodiment of the dispenser has been particularly illustrated and described herein, it is to be understood that minor variations may be made without departing from the spirit and scope of the invention as defined by the appended claims.

I claim:

1. A water dispenser for livestock, said dispenser comprising a casing, said casing being tubular and having a connecting portion at one end for attachment to a water line, said casing having an axial bore therethrough opening into said connecting portion for receiving water therefrom, a valve seat surrounding said bore, an axially movable valve member cooperable with said valve seat for closing said bore, a foot member connected to said valve member and disposed in said bore beyond said valve seat, a resilient member constantly resiliently urging said valve member toward said valve seat, a hollow mouthpiece extending axially out of said casing remote from said connecting portion, mounting means mounting an end portion of said mouthpiece in said casing in sealed relation to said bore for receiving water therefrom and for tilting relative to said casing axis, said mouthpiece having a relatively large radially outwardly directed flange adjacent said mounting means, said casing having a support ledge receiving said flange and forming a fulcrum for said mouthpiece, said foot member having a relatively large radially outwardly directed flange adjacent and engageable by said mouthpiece flange to axially shift said foot member and said valve member to an unseated position in response to tilting of said mouthpiece, a first ring insert defining said support ledge a second ring insert carried by said casing and having seated thereon the first ring insert, said second ring insert having a second ledge spaced from the support ledge, and said mounting means including a flexible annular member carried by said mouthpiece in sealed relation, and an outer portion of said flexible annular member being clamped between said ledges in sealed relation to said casing.

2. A water dispenser for livestock, said dispenser comprising a casing, said casing being tubular and having a connecting portion at one end for attachment to a water line, said casing having an axial bore therethrough opening into said connecting portion for receiving water therefrom, a valve seat surrounding said bore, an axially movable valve member cooperable with said valve seat for closing said bore, a foot member connected to said valve member and disposed in said bore beyond said valve seat, a resilient member constantly resiliently urging said valve member toward said valve seat, a hollow mouthpiece extending axially out of said casing remote from said connecting portion, mounting means mounting an end portion of said mouthpiece in said casing in sealed relation to said bore for receiving water therefrom and for tilting relative to said casing axis, said mouthpiece having a relatively large radially outwardly directed flange adjacent said mounting means, said casing having a support ledge receiving said flange and forming a fulcrum for said mouthpiece, said foot member having a relatively large radially outwardly directed flange adjacent and engageable by said mouthpiece flange to axially shift said foot member and said valve member to an unseated position in response to tilting of said mouthpiece, said foot member is of a polygonal cross-section and said foot member flange is carried by a sleeve telescoped over said foot member and cooperating therewith to define plural flow passages therebetween for the flow of water past said foot member and in a direction toward said mouthpiece.

3. A water dispenser for livestock, said dispenser comprising a casing, said casing being tubular and having a connecting portion at one end for attachment to a water line, said casing having an axial bore therethrough opening into said connecting portion for receiving water therefrom, a valve seat surrounding said bore, an axially movable valve member cooperable with said valve seat for closing said bore, a foot member connected to said valve member and disposed in said bore beyond said valve seat, a resilient member constantly resiliently urging said valve member toward said valve seat, a hollow mouthpiece extending axially out of said casing remote from said connecting portion, mounting means mounting an end portion of said mouthpiece in said casing in sealed relation to said bore for receiving water therefrom and for tilting relative to said casing axis, said mouthpiece having a relatively large radially outwardly directed flange adjacent said mounting means, said casing having a support ledge receiving said flange and forming a fulcrum for said mouthpiece, said foot member having a relatively large radially outwardly directed flange adjacent and engageable by said mouthpiece flange to axially shift said foot member and said valve member to an unseated position in response to tilting of said mouthpiece, said foot member is of a polygonal cross-section and has corner edges and said casing has axial grooves receiving said corner edges and guiding said foot member for axial movement in said casing.

4. A water dispenser for livestock, said dispenser comprising a casing, said casing being tubular and having a connecting portion at one end for attachment to a water line, said casing having an axial bore therethrough opening into said connecting portion for receiving water therefrom, a valve seat surrounding said bore, an axially movable valve member cooperable with said valve seat for closing said bore, a foot member connected to said valve member and disposed in said bore beyond said valve seat, a resilient member constantly resiliently urging said valve member toward said valve seat, a hollow mouthpiece extending axially out of said casing remote from said connecting portion, mounting means mounting an end portion of said mouthpiece in said casing in sealed relation to said bore for receiving water therefrom and for tilting relative to said casing axis, said mouthpiece having a relatively large radially outwardly directed flange adjacent said mounting means, said casing having a support ledge receiving said flange and forming a fulcrum for said mouthpiece, said foot member having a relatively large radially outwardly directed flange adjacent and engageable by said mouthpiece flange to axially shift said foot member and said valve member to an unseated position in response to tilting of said mouthpiece, and a loose ball is disposed between said flanges.

5. A water dispenser for livestock, said dispenser comprising a casing, said casing being tubular and having a connecting portion at one end for attachment to a water line, said casing having an axial bore therethrough opening into said connecting portion for receiving water therefrom, a valve seat surrounding said bore, an axially movable valve member cooperable with said valve seat for closing said bore, a foot member connected to said valve member and disposed in said bore beyond said valve seat, a resilient member constantly resiliently urging said valve member toward said valve seat, a hollow mouthpiece extending axially out of said casing remote from said connecting portion, mounting means mounting an end portion of said mouthpiece in said casing in sealed relation to said bore for receiving water therefrom and for tilting relative to said casing axis, said mouthpiece having a relatively large radially outwardly directed flange adjacent said mounting means, said casing having a support ledge receiving said flange and forming a fulcrum for said mouthpiece, said foot member having a relatively large radially outwardly directed flange adjacent and engageable by said mouthpiece flange to axially shift said foot member and said valve member to an unseated position in response to tilting of said mouthpiece, said connecting portion is tubular and has telescoped therein a filter member and an apertured nozzle member, said filter member including a sleeve portion, and said apertured nozzle member being removably telescoped into said sleeve portion, whereby said apertured nozzle member can be relatively readily removed and replaced relative to said filter member, wherein said nozzle member has a rim projecting from said sleeve portion, and said rim has a circumferential groove facilitating the gripping of said rim to effect removal of said nozzle member from said sleeve portion.

6. The water dispenser of claim 5 wherein said sleeve portion is formed of resilient material and has an external annular bead forming a seal with the interior of said connecting portion.

7. A water dispenser for livestock, said dispenser comprising a casing, said casing being tubular and having a connecting portion at one end for attachment to a water line, said casing having an axial bore therethrough opening into said connecting portion for receiving water therefrom, a valve seat surrounding said bore, an axially movable valve member cooperable with said valve seat for closing said bore, a foot member connected to said valve member and disposed in said bore beyond said valve seat, a resilient member constantly resiliently urging said valve member toward said valve seat, a hollow mouthpiece extending axially out of said casing remote from said connecting portion, mounting means mounting an end portion of said mouthpiece in said casing in sealed relation to said bore for receiving water therefrom and for tilting relative to said casing axis, said mouthpiece having a relatively large radially outwardly directed flange adjacent said mounting means, said casing having a support ledge receiving said flange and forming a fulcrum for said mouthpiece, said foot member having a relatively large radially outwardly directed flange adjacent and engageable by said mouthpiece flange to axially shift said foot member and said valve member to an unseated position in response to tilting of said mouthpiece, said casing has an adjustable abutment member selectively engageable with said mouthpiece to hold said mouthpiece in a tilted position and thereby effecting controlled constant water delivery.

8. A water dispenser for livestock, said dispenser comprising a casing, said casing being tubular and having a connecting portion at one end for attachment to a water line, said casing having an axial bore therethrough opening into said connecting portion for receiving water therefrom, a valve seat surrounding said bore, an axially movable valve member cooperable with said valve seat for closing said bore, a foot member connected to said valve member and disposed in said bore beyond said valve seat, a resilient member constantly resiliently urging said valve member toward said valve seat, a hollow mouthpiece extending axially out of said casing remote from said connecting portion, mounting means mounting an end portion of said mouthpiece in said casing in sealed relation to said bore for receiving water therefrom and for tilting relative to said casing axis, said mouthpiece having a relatively large radially outwardly directed flange adjacent said mounting means, said casing having a support ledge receiving said flange and forming a fulcrum for said mouthpiece, said foot member having a relatively large radially outwardly directed flange adjacent and engageable by said mouthpiece flange to axially shift said foot member and said valve member to an unseated position in response to tilting of said mouthpiece, said casing axis is generally horizontally disposed and there is a loose ball between said flanges.

* * * * *